United States Patent
Kim et al.

(10) Patent No.: US 8,665,622 B2
(45) Date of Patent: Mar. 4, 2014

(54) POWER SUPPLY UNIT SUPPLYING STANDBY POWER BY SHARING SWITCH OF MAIN CONVERTER

(75) Inventors: Chong Eun Kim, Daejeon (KR); Kyu Min Cho, Daejeon (KR); Don Sik Kim, Gyunggi-do (KR); Jae Kuk Kim, Incheon (KR); Gun Woo Moon, Daejeon (KR); Shin Young Cho, Seoul (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 158 days.

(21) Appl. No.: 13/333,100

(22) Filed: Dec. 21, 2011

(65) Prior Publication Data
US 2012/0163036 A1    Jun. 28, 2012

(30) Foreign Application Priority Data
Dec. 24, 2010 (KR) .................. 10-2010-0134705

(51) Int. Cl.
*H02M 7/537* (2006.01)

(52) U.S. Cl.
USPC .......................................... 363/131

(58) Field of Classification Search
USPC .............. 363/16, 17, 40, 55, 131, 132
See application file for complete search history.

(56) References Cited

U.S. PATENT DOCUMENTS

| 7,276,813 B2 * | 10/2007 | Dobbs et al. ............. 307/65 |
| 7,471,527 B2 * | 12/2008 | Chen ........................ 363/65 |
| 8,369,111 B2 * | 2/2013 | Balakrishnan et al. .... 363/21.15 |
| 2010/0073041 A1 * | 3/2010 | Djenguerian et al. ....... 327/143 |
| 2011/0095607 A1 * | 4/2011 | Humphrey et al. ........... 307/31 |

FOREIGN PATENT DOCUMENTS

| KR | 10-2008-0013242 A | 2/2008 |
| KR | 10-0887095 B1 | 2/2009 |
| KR | 20-2009-0003906 | 4/2009 |

OTHER PUBLICATIONS

Korean Office Action issued in Korean Application No. 10-2010-0134705, mailed on Oct. 29, 2012.

Chen, et al., "Dual Output DC-DC Converter with Shared ZCS Lagging Leg"; College of Electrical and Electronic Engineering, Huazhong University of Science and Technology, Wuham, China,IEEE, 2010.

* cited by examiner

*Primary Examiner* — Adolf Berhane
(74) *Attorney, Agent, or Firm* — McDermott Will & Emery LLP

(57) ABSTRACT

There is provided a power supply unit supplying a standby power by sharing a switch of a main converter. The power supply unit includes: a main converter, and a standby converter. The main converter controls a current flowing in a primary side winding of a main transformer and supplies a main power through a secondary side winding of the main transformer. The standby converter controls a current flowing in a primary side winding of a standby transformer and supplies a standby power through a secondary side winding of the standby transformer, and a portion of a plurality of switches of the main converter is included in switches of the standby converter.

7 Claims, 6 Drawing Sheets

POWER SUPPLY UNIT SUPPLYING STANDBY POWER BY SHARING SWITCH OF MAIN CONVERTER

CROSS-REFERENCE TO RELATED APPLICATIONS

This application claims the priority of Korean Patent Application No. 10-2010-0134705 filed on Dec. 24, 2010, in the Korean Intellectual Property Office, the disclosure of which is incorporated herein by reference.

BACKGROUND OF THE INVENTION

1. Field of the Invention

The present invention relates to a power supply unit, and more particularly, to a power supply unit having improved efficiency in a standby mode for maintaining a ready state before an electronic product is normally operated.

2. Description of the Related Art

Generally, a power supply unit of an electronic product includes a separate independent auxiliary converter in order to provide a standby power, in addition to a main converter for providing a main power. The power supply unit of the electronic product, having the above-mentioned structure supplies the main power to the electronic product through the main converter during an operation (hereinafter, referred to as a 'normal mode') of the electronic product, and supplies the standby power to the electronic product through the above separate standby converter during a standby mode (indicating a mode for maintaining a ready state before the electronic product is normally operated).

As the auxiliary converter for supplying the standby power, a flyback converter has mainly been used in recent years. While the flyback converter has been widely used due to the simple structure thereof, it may cause the efficiency of the entire power system to be lowered due to high voltage stress applied to switches and hard switching (indicating switching performed in a state in which the level of voltage between the switches or the level of current flowing in the switches is not zero).

SUMMARY OF THE INVENTION

An object of the present invention provides a power supply unit having improved efficiency.

According to an aspect of the present invention, there is provided a power supply unit including: a main converter including a primary side circuit including a plurality of switches connected to a primary side winding of a main transformer and a power supply input terminal to control a current flowing in the primary side winding of the main transformer and a secondary side circuit supplying a main power through a secondary side winding magnetically coupled to the primary side winding of the main transformer; and a standby converter including a primary side circuit including a plurality of switches connected to a primary side winding of a standby transformer and the power supply input terminal to control a current flowing in the primary side winding of the standby transformer and a secondary side circuit supplying a standby power through a secondary side winding magnetically coupled to the primary side winding of the standby transformer, wherein a portion of the plurality of switches of the main converter is included in the switches of the standby converter.

The plurality of switches of the main converter may include a first switch and a second switch connected in series and a third switch and a fourth switch connected in series, both terminals of the first switch and the second switch being connected in parallel with the power supply input terminal, and both terminals of the third switch and the fourth switch being connected in parallel with the power supply input terminal, and the primary side winding of the main transformer is connected between a first node, which is a connection point between the first switch and the second switch, and a second node, which is a connection point between the third switch and the fourth switch.

The standby converter may include the third switch and the fourth switch connected in parallel with the power supply input terminal; and an additional module including a clamping diode and a fifth switch connected in series, the clamping diode and the fifth switch being connected in parallel with the power supply input terminal, and the primary side winding of the standby transformer is connected between a third node, which is a connection point between the clamping diode and the fifth switch, and the second node.

The secondary side circuit of the standby converter may include: a diode having an anode connected to the secondary side winding of the standby converter; and a capacitor having one terminal of a cathode of the diode and the other terminal connected to a ground.

The secondary side circuit of the main converter may include: a line switching module including a sixth switch and a seventh switch each having one terminal connected to both terminals of the secondary side winding of the main transformer and the other terminal connected to each other; and an LC filter module connected in parallel with a center tap of the secondary side winding of the main transformer and the other terminals of the sixth and seventh switches.

Each of the first to seventh switches may include a body diode and a parasitic capacitor connected in parallel therewith, and each of the third to fifth switches may be turned on after the body diode is turned on.

The first and third switches or the second and fourth switches forming a closed loop together with the main transformer may be simultaneously turned on/off in a standby mode.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
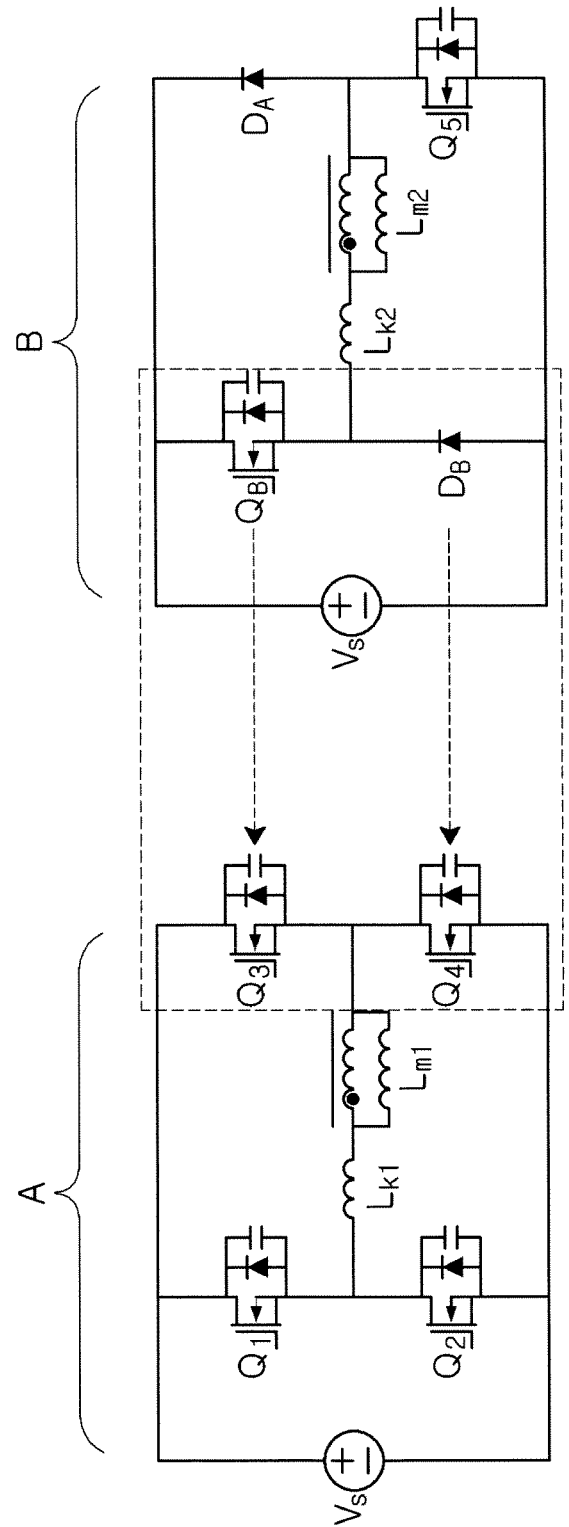
FIG. 1 is a concept diagram describing sharing of switches according to an exemplary embodiment of the present invention.

Hereinafter, exemplary embodiments will be described in detail with reference to the accompanying drawings so that they can be easily practiced by those skilled in the art to which the present invention pertains. However, in describing the exemplary embodiments of the present invention, detailed descriptions of well-known functions or constructions are omitted so as not to obscure the description of the present invention with unnecessary detail. In addition, like reference numerals denote parts performing similar functions and actions throughout the drawings.

FIG. 1 is a concept diagram illustrating the sharing of switches according to an exemplary embodiment of the present invention. A power supply unit according to an exemplary embodiment of the present invention is configured to include a phase shift full bridge (PSFB) converter as a main converter for supplying a main power and a two-switch flyback converter as a standby converter for supplying a standby power. Only primary side circuits A and B of the respective converters are shown in FIG. 1. A transformer is used for both of the main converter and the standby converter. Hereinafter, a circuit including a primary side winding of the transformer will be referred to as a primary side circuit, and a circuit including a secondary side winding of the transformer will be referred to as a secondary side circuit.

As shown in FIG. 1, the primary side circuit A of the main converter has a bridge structure formed by four switches $Q_1$ to $Q_4$, and the primary side circuit B of the standby converter has a bridge structure formed by two switches $Q_5$ and $Q_B$ and two diodes $D_A$ and $D_B$. According to an exemplary embodiment of the present invention, two switches $Q_3$ and $Q_4$ on the right side of the primary side circuit A of the main converter may be shared with the primary side circuit B of the standby converter. More specifically, the switch $Q_3$ is substituted for the switch $Q_B$ of the primary side circuit B of the standby converter, and the switch $Q_4$ is substituted for the diode $D_B$ of the primary side circuit B of the standby converter.

The power supply unit having the above structure will be described in detail with reference to FIG. 2.

Figure 2:
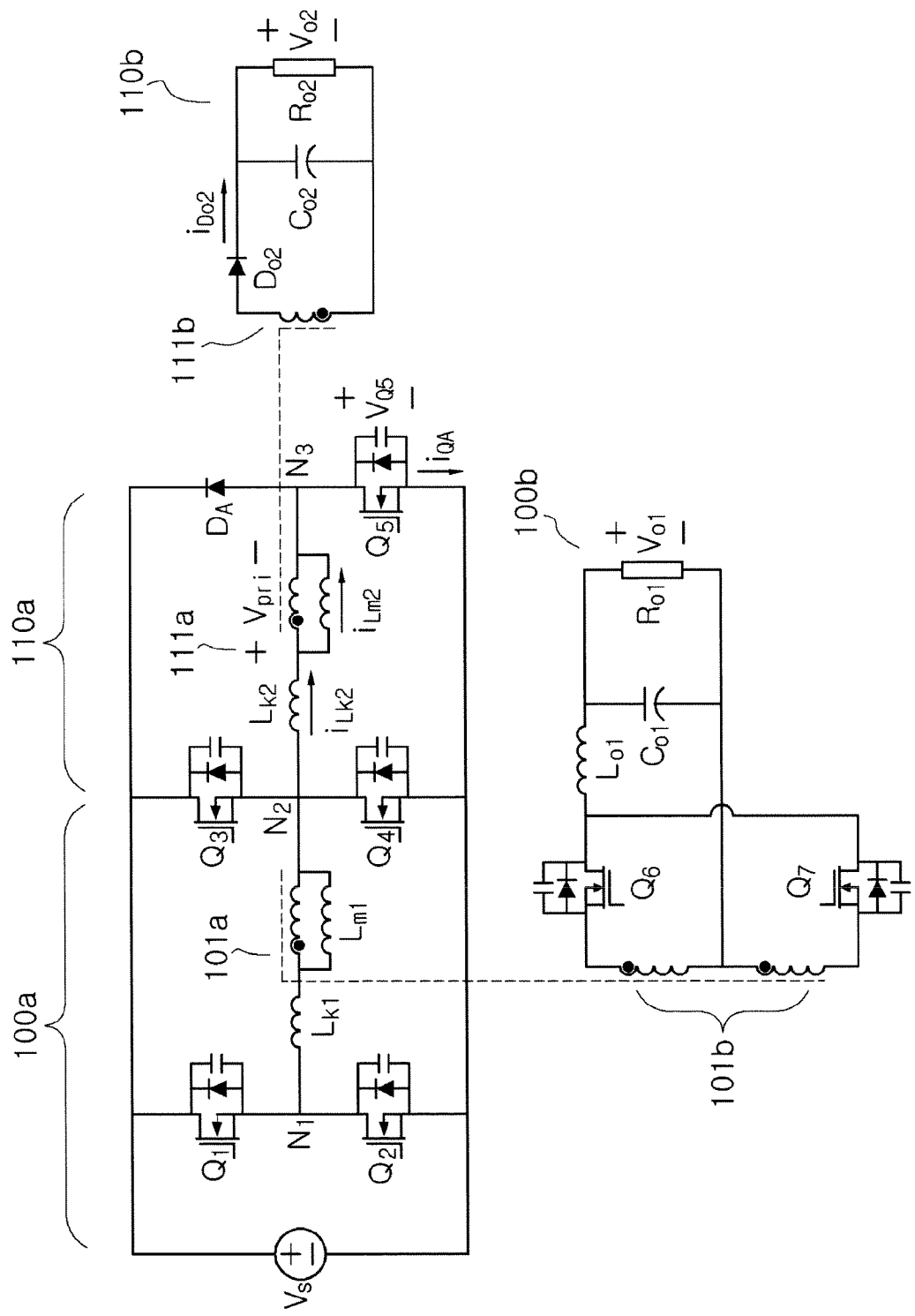
FIG. 2 is a configuration diagram of a power supply unit according to an exemplary embodiment of the present invention.

Referring to FIG. 2, a primary side circuit 100a of a main converter 100a and 100b may include a switching module $Q_1$ to $Q_4$ in which both terminals of the first switch $Q_1$ and the second switch $Q_2$ connected in series are connected in parallel with a power supply input terminal and both terminals of the third switch $Q_3$ and the fourth switch $Q_4$ connected in series are connected in parallel with the power supply input terminal, and a primary side winding 101a of a main transformer 101a and 101b connected between a first node N1, which is a connection point between the first switch $Q_1$ and the second switch $Q_2$, and a second node $N_2$, which is a connection point between the third switch $Q_3$ and the fourth switch $Q_4$.

A secondary side circuit 100b of the main converter 100a and 100b includes a secondary side winding 101b magnetically coupled to the primary side winding 101a of the main transformer 101a and 101b, a line switching module including a sixth switch $Q_6$ and a seventh switch $Q_7$ connected to both terminals of the secondary side winding 101b to control a current flowing in an LC filter module $L_{01}$ and $C_{01}$, behind them, and the LC filter module $L_{01}$ and $C_{01}$ connected between a center of the secondary side winding 101b and one terminal of the secondary side winding 101b, and supplies a main power $V_{o1}$ powered from the primary side circuit 100a to a load $R_{o1}$.

Meanwhile, a primary side circuit 110a of a standby converter 110a and 110b may include an additional module connected in parallel with both terminals of the third switch $Q_3$ and the fourth switch $Q_4$ connected in series and including a clamping diode DA and the fifth switch $Q_5$ connected in series, and a primary side winding 111a of a standby transformer 111a and 111b connected between a third node N3, which is a connection point between the clamping diode $D_A$ and the fifth switch $Q_5$, and the second node N2.

Finally, a secondary side circuit 110b of the standby converter 110a and 110b may include a secondary side winding 111b magnetically coupled to the primary side winding 111a of the standby transformer 111a and 111b, a diode Do2 having an anode connected to one terminal of the secondary side winding 111b, and a capacitor $C_{02}$ having one terminal connected to a cathode of the diode $D_{02}$ and the other terminal connected to a ground. In addition, in each of the first switch $Q_1$ to the seventh switch $Q_7$, a parasitic capacitor C and a body diode D are connected in parallel with each other.

Figure 3:
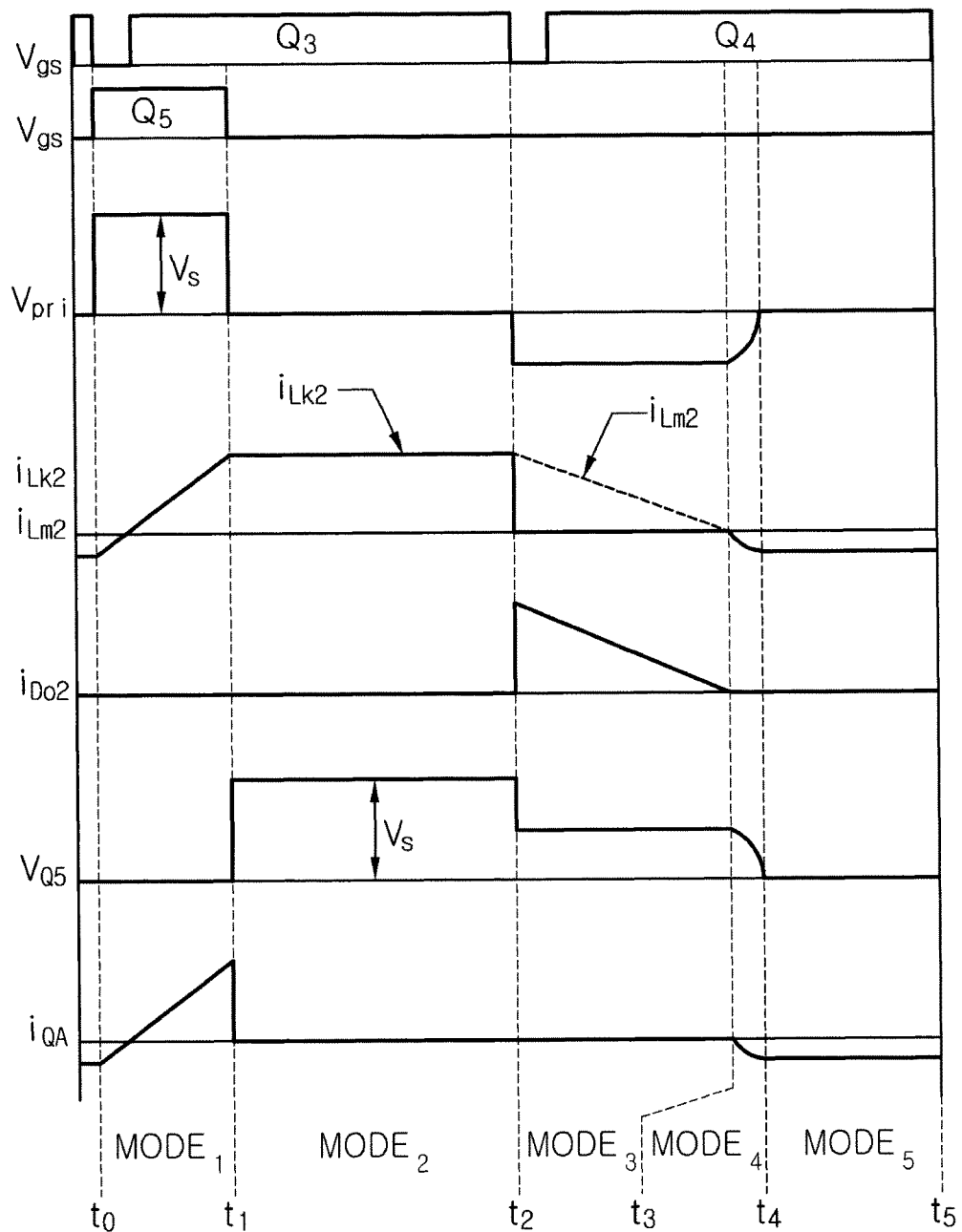
FIG. 3 is a waveform diagram showing waveforms of main components of a power converter according to an exemplary embodiment of the present invention in the case of a standby mode.

FIG. 3 is a waveform diagram showing waveforms of main components of a power converter according to an exemplary embodiment of the present invention in a standby mode; and FIGS. 4 through 8 are diagrams showing elements activated in mode 1 to mode 5 of a power supply unit according to an exemplary embodiment of the present invention.

Meanwhile, in describing an operation for each mode, it is assumed that the main transformer 101a and 101b, is an ideal transformer, which includes a magnetizing inductor $L_{m1}$ and a leakage inductor $L_{k1}$, and the standby transformer 111a and 111b, is also an ideal transformer including a magnetizing inductor $L_{m2}$ and a leakage inductor $L_{k2}$. Meanwhile, it is assumed that a turn ratio of the primary side and the secondary side is N (N=Np/Ns). Here, Np refers to the number of the primary side windings of the main transformer 101a and 101b and the standby transformer 111a and 111b, and Ns refers to the number of the secondary side windings of the main transformer 101a and 101b and the standby transformer 111a and 111b. In addition, it is assumed that an input power Vs and a standby power $V_{o2}$ are constant, the respective switches $Q_3$ to $Q_5$ are ideal with the exception of the parasitic capacitor C and the body diode D, and other diodes $D_A$ and $D_{02}$ are also ideal.

Hereinafter, referring to FIGS. 3 through 8, an operational principle of a power supply unit will be described in detail for each mode thereof in the case of a standby mode. Meanwhile, although not specifically shown in the drawings, the first switch $Q_1$ is turned on/off simultaneously with the third switch $Q_3$, and the second switch $Q_2$ is turned on/off simultaneously with the fourth switch $Q_4$. Two switches $Q_1$ and $Q_3$ or $Q_2$ and $Q_4$ forming a closed loop together with the primary side winding 101a of the main transformer 101a and 101b may be simultaneously turned on/off to short circuit the primary side winding 101a, thereby preventing the main power $V_{o1}$ from being outputted.

(A) Mode 1 (t0~t1): Build-Up Period

Figure 4:
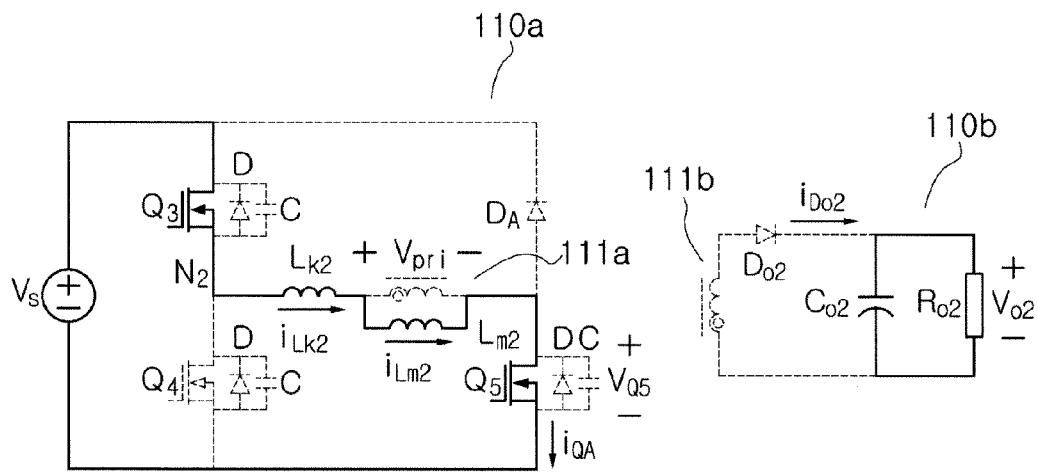
FIGS. 4 through 8 are diagrams showing elements activated in mode 1 to mode 5 of a power supply unit according to an exemplary embodiment of the present invention.

Referring to FIGS. 3 and 4, as a gate signal of the fifth switch $Q_5$ becomes high (H) the mode 1 begins. At t0, (assuming that the body diode of the $Q_5$ is turned on, prior to the mode 1) the fifth switch $Q_5$ is turned on through zero voltage switching. Since the third switch $Q_3$ and the fifth switch $Q_5$ are in a turned on state, a voltage $V_{pri}$ at the primary side winding 111a of the standby transformer 111a and 111b is clamped to the input power Vs. Therefore, a primary side current $i_{Lk2}$ linearly increases, and energy is stored in the magnetizing inductance $L_{m2}$ of the standby transformer 111a and 111b. As the fifth switch $Q_5$ is turned off, the mode 1 ends. A magnetizing current $i_{Lm2}$ may be simply represented by the following Equation 1.

$$i_{Lm2}(t) = i_{Lm2}(t_0) + \frac{V_S}{L_{m2} + L_{k2}}(t - t_0)$$ [Equation 1]

(B) Mode 2 (t1~t2): Freewheeling Period

Figure 5:
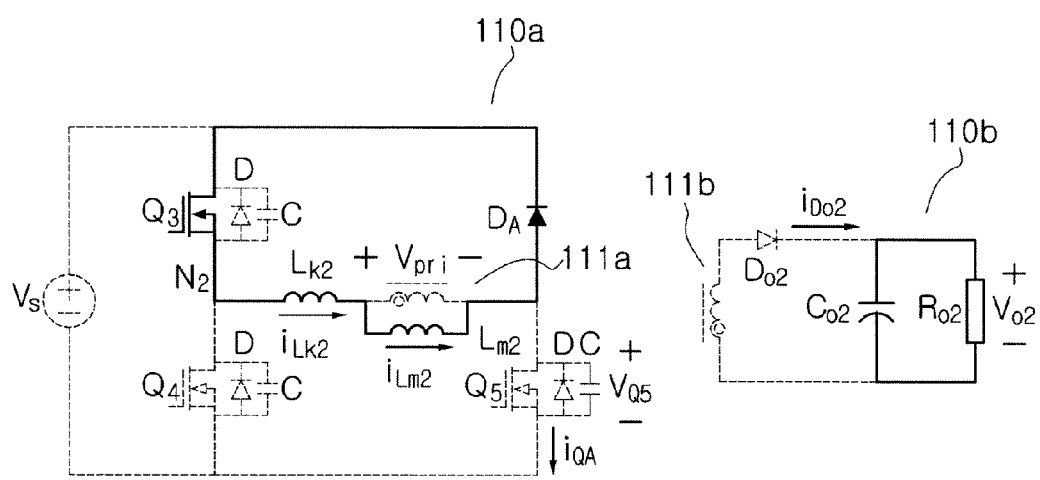

The mode 2 is a freewheeling period. Referring to FIGS. 3 and 5, since the fifth switch $Q_5$ is turned off at t1, the voltage $V_{pri}$ at the primary side winding 111a of the standby transformer 111a and 111b decreases to 0, and a voltage $V_{Q5}$ applied to the parasitic capacitor C of the fifth switch $Q_5$ increases up to the input power Vs. In addition, the primary side current $i_{Lk2}$ flowing in the primary side winding 111a of the standby transformer 111a and 111b is freewheeled to the clamping diode $D_A$ and the third switch $Q_3$. The primary side current $i_{Lk2}$ is constantly maintained. As the fifth switch $Q_3$ is turned off, the mode 2 ends.

In the mode 2, the magnetizing current $i_{Lm2}$ may be given by the following Equation 2.

$$i_{Lm2}(t) = i_{Lm2}(t_1)$$ [Equation 2]

(C) Mode 3 (t2~t3): Powering Period

Figure 6:
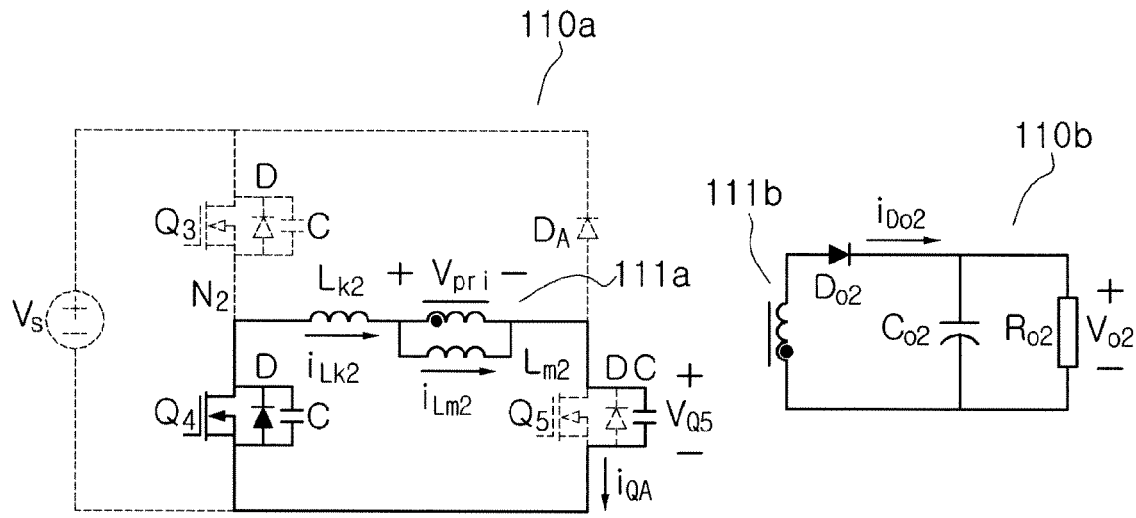

The mode 3 is a powering period. Referring to FIGS. 3 and 6, as the third switch $Q_3$ is turned off at t2, the mode 3 starts. The energy stored in the mode 1 is transferred to the secondary side circuit 110b. At the same time, the magnetizing current $i_{Lm2}$ decreases to the level of 0. As the magnetizing current $i_{Lm2}$ decreases to the level of 0, the mode 3 ends.

The magnetizing current $i_{Lm2}$ may be determined by the following Equation 3.

$$i_{Lm2}(t) = i_{Lm2}(t_2) + \frac{NV_{o2}}{L_{m2}}(t-t_2)$$ [Equation 3]

(D) Mode 4 (t3~t4): Resonant Period

Figure 7:
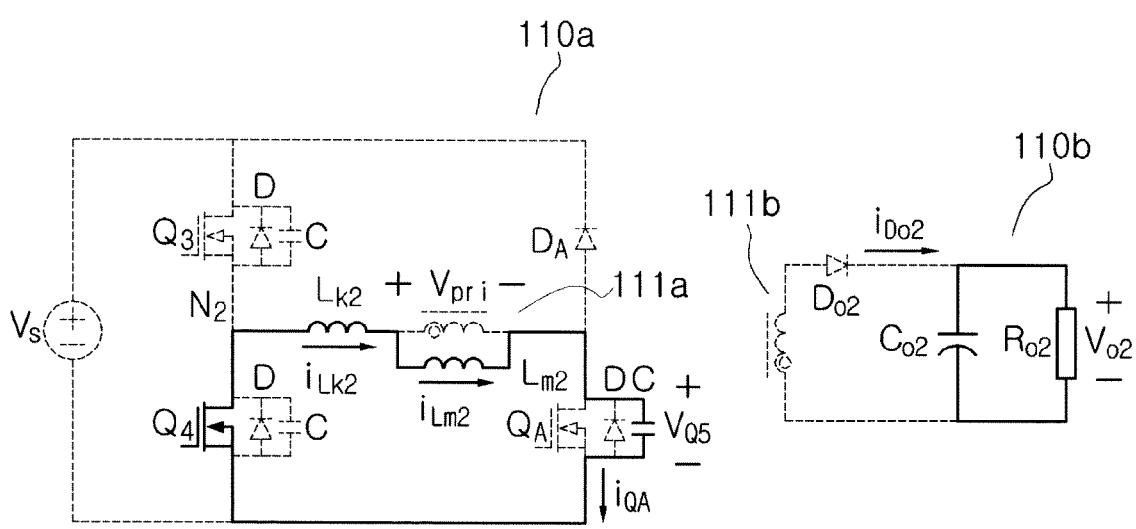

The mode 4 is a resonant period. Referring to FIGS. 3 and 7, the magnetizing current $i_{Lm2}$ is 0 at t3. The magnetizing inductance Lm2 and the leakage inductance $L_{k2}$ resonate with the parasitic capacitor C of the fifth switch $Q_5$, and the magnetizing current $i_{Lm2}$ is reduced to the level of minus (−) during the period of mode 4. Here, the magnetizing current $i_{Lm2}$ discharges the parasitic capacitor of the fifth switch $Q_5$ through a channel of the fourth switch $Q_4$ in a turned on state. As a result, the body diode D of the fifth switch $Q_5$ is turned on, and the zero voltage switching of the fifth switch $Q_5$ may be ensured.

The magnetizing current $i_{Lm2}$ may be given by the following Equation 4.

$$i_{Lm2}(t) = -\frac{V_{Q5}(t_3)}{Zr}\sin(\omega_r t)$$ [Equation 4]

Where, $$\omega_r = \frac{1}{\left(\sqrt{(L_{m2}+L_{k2})C_{oss}}\right)}, Zr = \sqrt{\frac{L_{m2}+L_{k2}}{C_{oss}}}.$$

Meanwhile, $Z_r$ indicates resonant impedance, $\omega_r$ indicates a resonant frequency, and Coss indicates a parasitic capacitance C.

(E) Mode 5 (t4~t5)

Figure 8:
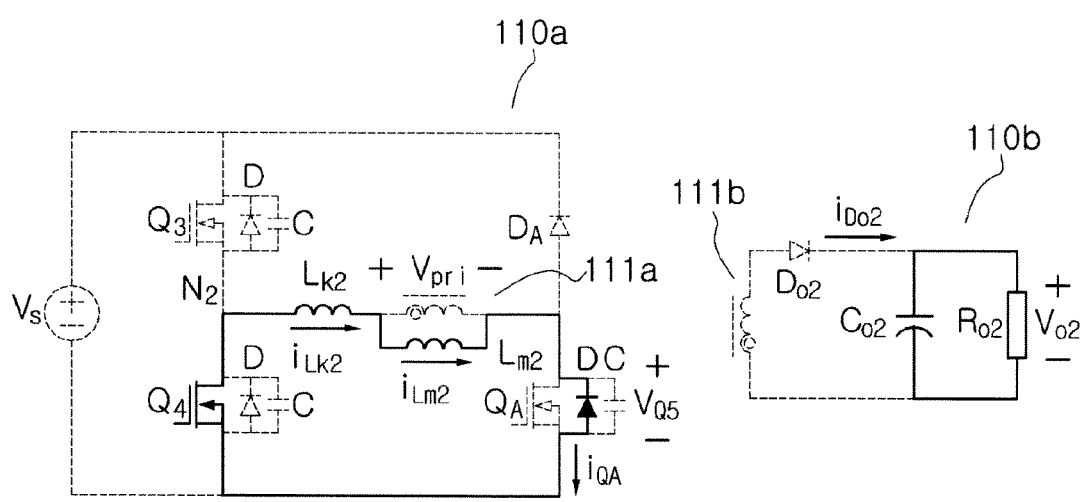

Referring to FIGS. 3 and 8, the body diode D of the fifth switch $Q_5$ is turned on, and the primary side current $i_{Lk2}$ flowing in the primary side winding 111a of the standby transformer 111a and 111b flows in the body diode D of the fifth switch $Q_5$ and the fourth switch $Q_4$. Since the direction of the primary side current $i_{Lk2}$ is still (−), the fifth switch $Q_5$ may be turned on the zero voltage switching in the following mode.

As set forth above, according to the exemplary embodiments of the present invention, a portion $Q_3$ and $Q_4$ of the switches of the main converter 100a and 100b may be shared with the standby converter 110a and 110b, whereby the standby power may be supplied and the efficiency of the power supply unit may be improved through the zero voltage switching.

The exemplary embodiments of the present invention have been described with reference to the accompanying drawings. Herein, specific terms have been used, but are just used for the purpose of describing the present invention and are not used for qualifying the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

What is claimed is:

1. A power supply unit comprising:
a main converter including a primary side circuit including a plurality of switches connected to a primary side winding of a main transformer and a power supply input terminal to control a current flowing in the primary side winding of the main transformer and a secondary side circuit supplying a main power through a secondary side winding magnetically coupled to the primary side winding of the main transformer; and
a standby converter including a primary side circuit including a plurality of switches connected to a primary side winding of a standby transformer and the power supply input terminal to control a current flowing in the primary side winding of the standby transformer and a secondary side circuit supplying a standby power through a secondary side winding magnetically coupled to the primary side winding of the standby transformer,
wherein a portion of the plurality of switches of the main converter is included in the switches of the standby converter, and
wherein the plurality of switches of the main converter include:
a first switch and a second switch connected in series and a third switch and a fourth switch connected in series, both terminals of the first switch and the second switch being connected in parallel with the power supply input terminal, and both terminals of the third switch and the fourth switch being connected in parallel with the power supply input terminal, and
the primary side winding of the main transformer is connected between a first node, which is a connection point between the first switch and the second switch, and a second node, which is a connection point between the third switch and the fourth switch.

2. The power supply unit of claim 1, wherein the standby converter includes:
the third switch and the fourth switch connected in parallel with the power supply input terminal; and
an additional module including a clamping diode and a fifth switch connected in series, the clamping diode and the fifth switch being connected in parallel with the power supply input terminal, and the primary side winding of the standby transformer is connected between a third node, which is a connection point between the clamping diode and the fifth switch, and the second node.

3. The power supply unit of claim 2, wherein the secondary side circuit of the standby converter includes:
   a diode having an anode connected to the secondary side winding of the standby converter; and
   a capacitor having one terminal of a cathode of the diode and the other terminal connected to a ground.

4. The power supply unit of claim 2, wherein the secondary side circuit of the main converter includes:
   a line switching module including a sixth switch and a seventh switch each having one terminal connected to both terminals of the secondary side winding of the main transformer and the other terminal connected to each other; and
   an LC filter module connected in parallel with a center tap of the secondary side winding of the main transformer and the other terminals of the sixth and seventh switches.

5. The power supply unit of claim 4, wherein each of the first to seventh switches includes a body diode and a parasitic capacitor connected in parallel therewith.

6. The power supply unit of claim 5, wherein each of the third to fifth switches is turned on after the body diode is turned on.

7. The power supply unit of claim 3, wherein the first and third switches or the second and fourth switches forming a closed loop together with the main transformer are simultaneously turned on/off in a standby mode.

* * * * *

UNITED STATES PATENT AND TRADEMARK OFFICE
CERTIFICATE OF CORRECTION

PATENT NO. : 8,665,622 B2  
APPLICATION NO. : 13/333100  
DATED : March 4, 2014  
INVENTOR(S) : Chong Eun Kim et al.

Page 1 of 1

It is certified that error appears in the above-identified patent and that said Letters Patent is hereby corrected as shown below:

On the title page, item (73) Assignee should read: Samsung Electro-Mechanics Co., Ltd., Suwon, Gyunggi-do (KR); <u>Korea Advanced Institute of Science and Technology, Yuseong-dong, Daejeon (KR)</u>

Signed and Sealed this  
Ninth Day of December, 2014

Michelle K. Lee  
*Deputy Director of the United States Patent and Trademark Office*